(12) United States Patent
Wu

(10) Patent No.: US 12,289,727 B2
(45) Date of Patent: Apr. 29, 2025

(54) METHOD AND APPARATUS FOR TRANSMITTING UPLINK CONTROL INFORMATION, DEVICE, AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 433 days.

(21) Appl. No.: 17/853,020

(22) Filed: Jun. 29, 2022

(65) Prior Publication Data

US 2022/0353861 A1 Nov. 3, 2022

Related U.S. Application Data

(63) Continuation of application No. PCT/CN2019/130819, filed on Dec. 31, 2019.

(51) Int. Cl.
*H04W 72/04* (2023.01)
*H04L 5/00* (2006.01)
*H04W 72/21* (2023.01)

(52) U.S. Cl.
CPC ........... *H04W 72/21* (2023.01); *H04L 5/0053* (2013.01)

(58) Field of Classification Search
CPC .. H04W 72/21; H04W 72/569; H04L 1/1854; H04L 1/1896; H04L 5/0044; H04L 5/0053
See application file for complete search history.

(56) References Cited

U.S. PATENT DOCUMENTS

| 2018/0167933 A1 | 6/2018 | Yin et al. | |
| 2019/0037586 A1* | 1/2019 | Park | H04L 5/00 |
| 2021/0314983 A1* | 10/2021 | Karaki | H04W 72/23 |

FOREIGN PATENT DOCUMENTS

| CN | 110474747 A | 11/2019 |
| WO | 2019219082 A1 | 11/2019 |

OTHER PUBLICATIONS

Extended European Search Report dated Nov. 16, 2022 received in European Patent Application No. EP19958469.9.
Samsung: "HARQ enhancement for NR-U" , 3GPP Draft; RI-1910461 , 3rd Generation Partnership Project (3GPP) , Mobile Competence Centre ; 650 , Route Des Lucioles ; F-06921 Sophia-Antipolis Cedex ; France vol. RAN WG1 , no. Chongqing, China; Oct. 14, 2019-Oct. 20, 2019 Oct. 8, 2019 (Oct. 8, 2019), XP051809124.

(Continued)

*Primary Examiner* — Mansour Oveissi
(74) *Attorney, Agent, or Firm* — Sheppard, Mullin, Richter & Hampton LLP

(57) ABSTRACT

The present disclosure discloses a method and apparatus for transmitting uplink control information, a device, and a storage medium, relating to the field of mobile communication. The method includes: determining, based on first Downlink Control Information (DCI), m Physical Uplink Shared Channels (PUSCHs) to be transmitted, where m is a positive integer; and transmitting, when the m PUSCHs overlap at least one Physical Uplink Control Channel (PUCCH) in a time domain, uplink control information carried in the at least one PUCCH.

17 Claims, 6 Drawing Sheets

(56) References Cited

OTHER PUBLICATIONS

Qualcomm Incorporated: "Summary of remaining issues for UCImultiplexing on PUSCH", 3GPP Draft; RI-1805554 Summary of Remaining Issues for UCI Multiplexing on PUSCH, 3rd Generation Partnership Project (3GPP), Mobile Competence Centre ; 650 , Route Des Lucioles ; F-06921 Sophia-Antipol vol. RAN WG1 , no. Sanya, China; Apr. 16, 2018-Apr. 20, 2018 Apr. 16, 2018 (Apr. 16, 2018) , XP051427562.

International Search Report and Written Opinion dated Oct. 10, 2020 in International Application No. PCT/CN2019/130819. English translation attached.

Qualcomm Incorporated. R1-1805554, "Summary of remaining issues for UCI multiplexing on PUSCH", May 25, 2018(May 25, 2018), 2.5 Overlapped multi-slot PUCCH/PUSCH.

OPPO. "3GPP TSG RAN WG1 #97, R1-1907683", Summary on UCI enhancements for URLLC, May 17, 2019 (May 17, 2019), Proposals 10, 13.

* cited by examiner

METHOD AND APPARATUS FOR TRANSMITTING UPLINK CONTROL INFORMATION, DEVICE, AND STORAGE MEDIUM

CROSS-REFERENCE TO RELATED APPLICATIONS

The present application is a continuation of International Application No. PCT/CN2019/130819 filed on Dec. 31, 2019, which is hereby incorporated by reference in its entirety.

TECHNICAL FIELD

The present disclosure relates to the field of mobile communication, and more particularly, to a method and apparatus for transmitting uplink control information, a device, and a storage medium.

BACKGROUND

An unlicensed frequency spectrum is a shared frequency spectrum allocated by countries or regions for radio device communication. That is, communication devices in different communication systems can use the frequency spectrum as long as they meet regulatory requirements set by a corresponding country or region on the frequency spectrum, without applying for proprietary frequency spectrum authorization from the government.

When a terminal device transmits data on an unlicensed frequency spectrum, a conflict may occur between a Physical Uplink Shared Channel (PUSCH) and a Physical Uplink Control Channel (PUCCH) that are to be transmitted.

It is an urgent technical problem to be solved how a terminal device performs uplink transmission when the conflict occurs between the PUSCH and the PUCCH that are to be transmitted.

SUMMARY

Embodiments of the present disclosure provide a method and apparatus for transmitting uplink control information, a device, and a storage medium.

In an aspect of the present disclosure, a method for transmitting uplink control information is provided. The method is applied in a terminal device, and includes: determining, based on first Downlink Control Information (DCI), m PUSCHs to be transmitted, where m is a positive integer; and transmitting, when the m PUSCHs overlap at least one PUCCH in a time domain, uplink control information carried in the at least one PUCCH.

In an aspect of the present disclosure, a method for transmitting uplink control information is provided. The method is applied in a network device, and includes: transmitting first DCI to a terminal device, wherein the first DCI is used to schedule m PUSCHs, where m is a positive integer; and receiving, when the m PUSCHs overlap at least one PUCCH in a time domain, uplink control information carried in the at least one PUCCH.

In an aspect of the present disclosure, a terminal device is provided. The terminal device includes: a processor; a transceiver connected to the processor; and a memory configured to store instructions executable by the processor. The processor is configured to load and execute the executable instructions to perform the method for transmitting the uplink control information as described above.

In an aspect of the present disclosure, a network device is provided. The network device includes: a processor; a transceiver connected to the processor; and a memory configured to store instructions executable by the processor. The processor is configured to load and execute the executable instructions to perform the method for transmitting the uplink control information as described above.

BRIEF DESCRIPTION OF DRAWINGS

In order to clearly explain technical solutions in the embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

Figure 1:
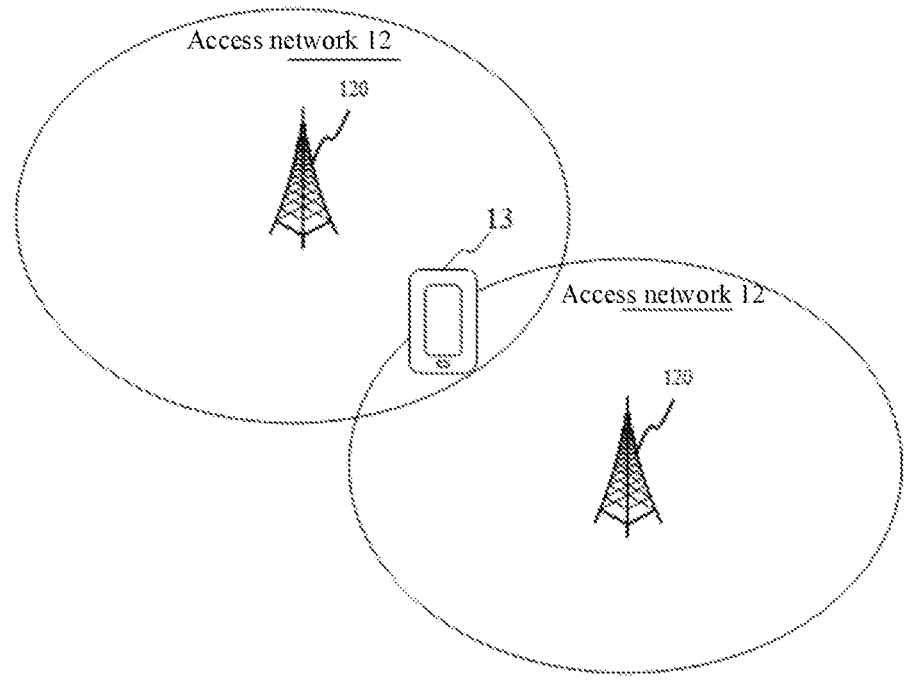
FIG. 1 is a block diagram showing a communication system according to an exemplary embodiment of the present disclosure.

In order to make objectives, technical solutions, and advantages of the present disclosure more apparent, the embodiments of the present disclosure will be described in detail below with reference to the accompanying drawings.

First, a brief introduction will be made to terms involved in the embodiments of the present disclosure.

New Radio (NR)-based unlicensed frequency spectrum: this is a frequency spectrum allocated by countries and regions for radio device communication, and is generally considered to be a shared frequency spectrum. That is, communication devices in different communication systems can use the frequency spectrum as long as they meet regulatory requirements set by a corresponding country or region on the frequency spectrum, without applying for proprietary frequency spectrum authorization from the government.

In order to allow various communication systems that use an unlicensed frequency spectrum for wireless communication to coexist friendly on the unlicensed frequency spectrum, some countries or regions have stipulated legal requirements that must be met when using the unlicensed frequency spectrum. For example, a communication device follows the "Listen Before Talk (LBT)" principle. That is, the communication device needs to perform channel listening before transmitting signals on a channel of the unlicensed frequency spectrum. Only when a result of the channel listening indicates that the channel is idle, the communication device can transmit a signal on the channel. When the result of the channel listening by the communication device on the channel of the unlicensed frequency spectrum indicates that the channel is busy, the communication device cannot transmit any signal on the channel. In order to ensure fairness, in one transmission, a time duration when the communication device uses the channel of the unlicensed frequency spectrum for signal transmission cannot exceed Maximum Channel Occupancy Time (MCOT).

Multi-PUSCH scheduling: in the New Radio-Unlicensed (NR-U) system, a network device can schedule, for a terminal device, m PUSCH transmissions through a non-fallback UpLink (UL) grant, such as a DCI format 0_1. The m PUSCHs are continuous in a time domain, where m is a positive integer. Optionally, a maximum value of m is 8.

The network device configures a first Time Domain Resource Assignment (TDRA) set through a higher layer parameter, and the first TDRA set includes at least one row of TDRA parameters. Each row of TDRA parameters includes a TDRA of at least one PUSCH. When the network device schedules m PUSCH transmissions through the non-fallback UL grant (such as the DCI format 0_1), time domain resource assignment indication information in the non-fallback UL grant may indicate a row of TDRA parameters in the first TDRA set, and the row of TDRA parameters includes TDRAs of the m PUSCHs.

When a value of m is greater than 1, each PUSCH of the m PUSCHs scheduled by the non-fallback UL grant includes 1-bit Redundancy Version (RV) indication information and 1-bit New Data Indicator (NDI) indication information. When the value of m is equal to 1, the PUSCH scheduled by the non-fallback UL grant includes 2-bit RV indication information. Here, the RV indication information is used to indicate the RV, and the NDI indication information is used to indicate whether data carried in the PUSCH is newly transmitted data.

In case where a Channel State Information (CSI) feedback is activated simultaneously by the non-fallback UL grant, when m≤2, the CSI feedback is carried on an PUSCH among the m PUSCHs that is scheduled last; and when m>2, the CSI feedback is carried on a PUSCH among the m PUSCHs that is scheduled penultimately.

NR-based PUSCH transmission: in an NR system, transmission of a PUSCH is determined based on a PUSCH preparation time ($N_2$ processing capability). A processing capability 1 and a processing capability 2 of a terminal correspond to different $N_2$ processing capabilities. In other words, a value of the PUSCH preparation time $N_2$ corresponding to the processing capability 1 of the terminal is different from a value of the PUSCH preparation time $N_2$ corresponding to the processing capability 2 of the terminal. Table 1 and Table 2 illustrate values of the PUSCH preparation time $N_2$ under different processing capabilities of the terminal respectively.

TABLE 1

PUSCH preparation time corresponding to the processing capability 1 of the terminal

| μ | PUSCH preparation time $N_2$ (symbols) |
|---|---|
| 0 | 10 |
| 1 | 12 |
| 2 | 23 |
| 3 | 36 |

TABLE 2

PUSCH preparation time corresponding to the processing capability 2 of the terminal

| μ | PUSCH preparation time $N_2$ (symbols) |
|---|---|
| 0 | 5 |
| 1 | 5.5 |
| 2 | 11 |
| | (frequency range 1) |

When the terminal receives uplink grant information from the network device, the uplink grant information schedules the terminal to transmit a target PUSCH carrying a target transmission block and a DeModulation Reference Signal (DMRS). The terminal determines, based on the uplink grant information (for example, based on Start and Length Indication Value (SLIV) indication in the uplink grant information), a starting position of a beginning uplink symbol of the target PUSCH with an influence of timing advance taken into consideration. When the starting position of the beginning uplink symbol is not earlier than a symbol L2, the terminal shall transmit the target transmission block; otherwise, the terminal shall ignore the uplink grant information.

Here, the symbol L2 is defined as an uplink symbol immediately after an ending position of an ending symbol of a Physical Downlink Control Channel (PDCCH) that carries the uplink grant information. Here, a starting position of a Cyclic Prefix (CP) of the uplink symbol immediately after the ending position of the ending symbol of the PDCCH is later than $T_{proc,2}$, which is illustrated in equation 1:

$$T_{proc,2} = \max((N_2+d_{2,1})(2048+144)\cdot\kappa 2^{-\mu}\cdot T_C, d_{2,2}) \quad (1)$$

In the equation, μ corresponds to a greater subcarrier spacing in ($\mu_{DL}$, $\mu_{UL}$), $\mu_{DL}$ represents a subcarrier spacing of a PDCCH that schedules a PUSCH, and $\mu_{UL}$ represents a subcarrier spacing for uplink data transmission. $N_2$ represents the PUSCH preparation time, which is illustrated in Table 1 and Table 2. When a beginning symbol in the PUSCH is only used to transmit a DMRS, $d_{2,1}=0$; otherwise $d_{2,1}=1$. When the scheduled DCI triggers a BandWidth Part (BWP) handover, $d_{2,2}$ is equal to a handover time; otherwise $d_{2,2=0}$. $T_C=1/(\Delta f_{max}\cdot N_f)$, $\Delta f_{max}=480\cdot 10^3$ Hz, $N_f=4096$ κ=64, and Λ is defined in sub-clause 4.41 of [4, TS 38.211].

NR-based PUCCH transmission: In the NR system, transmission of a PUCCH is determined based on a Physical Downlink Shared Channel (PDSCH) processing time ($N_1$ processing capability). A processing capability 1 and a processing capability 2 of the terminal correspond to different $N_1$ processing capabilities. In other words, a PDSCH preparation time (Ni value) corresponding to the processing capability 1 of the terminal is different from a PDSCH preparation time ($N_1$ value) corresponding to the processing capability 2 of the terminal. Table 3 and Table 4 illustrate $N_1$ values under different processing capabilities of the terminal respectively.

TABLE 3

PDSCH processing time corresponding to the processing capability 1 of the terminal PDSCH decoding time $N_1$ (symbols)

| μ | dmrs-AdditionalPosition = pos0 in DMRS-DownlinkConfig in both DMRS mapping type A and DMRS mapping type B | dmrs-AdditionalPosition ≠ pos0 in DownlinkConfig in either DMRS mapping type A or DMRS mapping type B, or the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 4

PDSCH processing time corresponding to the processing capability 2 of the terminal PDSCH decoding time $N_1$ (symbols)
dmrs-AdditionalPosition = pos0 in DMRS-DownlinkConfig

| μ | in both DMRS mapping type A and DMRS mapping type B |
|---|---|
| 0 | 3 |
| 1 | 4 |
| 2 | 9 |
| | (frequency range 1) |

When the terminal receives downlink grant information from the network device, the downlink grant information schedules the terminal to receive a PDSCH carrying a target transmission block. The terminal determines, based on allocated Hybrid Automatic Repeat reQuest-Acknowledgement (HARQ-ACK) timing information K1 and PUCCH resource indication information, HARQ-ACK information corresponding to the scheduled PDSCH for transmission through a target PUCCH. When a starting position of a beginning uplink symbol of the target PUCCH with an influence of timing advance taken into consideration is not earlier than a symbol L1, the terminal shall provide valid HARQ-ACK information for the scheduled PDSCH; otherwise, the terminal may not provide the valid HARQ-ACK information for the scheduled PDSCH.

Here, the symbol L1 is defined as an uplink symbol immediately after an ending position of an ending symbol of a PDSCH that carries the target transmission block. Here, a starting position of a CP of the uplink symbol immediately after the ending position of the ending symbol of the PDSCH is later than $T_{proc,1}$, which is illustrated in equation 2:

$$T_{proc,1} = \max((N_1 + d_{1,1})(2048+144) \cdot \kappa 2^{-\mu} \cdot T_C) \qquad (2)$$

In the equation, a corresponds to a greater subcarrier spacing in ($\mu_{PDCCH}$, $\mu_{PDSCH}$, $\mu_{UL}$). Here, $\mu_{PDCCH}$ corresponds to a subcarrier spacing of a PDCCH that schedules a PDSCH, $\mu_{PDSCH}$ corresponds to a subcarrier spacing of the scheduled PDSCH, and $\mu_{UL}$ corresponds to a subcarrier spacing of an uplink channel on which HARQ-ACK is to be transmitted. $N_1$ represents the PDSCH processing time, which is illustrated in Table 3 and Table 4. A value of d1,1 is related to mapping types of the PDSCH and a symbol length of the PDSCH. $T_C = 1/(\Delta f_{max} \cdot N_f)$, $\Delta f_{max} = 480 \cdot 10^3$ Hz, $N_f = 4096$, $\kappa = 64$, and κ is defined in sub-clause 4.41 of [4, TS 38.211].

FIG. 1 illustrates a block diagram showing a communication system according to an exemplary embodiment of the present disclosure. The communication system may include an access network 12 and a terminal device 13.

The access network 12 includes a number of network devices 120. The network device 120 may be a base station, which is an apparatus deployed in an access network to provide a wireless communication function for a terminal. The base station may include various forms of macro base station, micro base station, relay station, access point and so on. In systems using different radio access technologies, a device serving as a base station may have different names. For example, in a Long Term Evolution (LTE) system, the device serving as a base station may be called Evolved Node B (eNodeB or eNB); and in a 5th Generation (5G) NR-U system, the device serving as a base station may be called gNodeB or gNB. As communication technology evolves, how "base station" is called may change. For the convenience of the embodiments of the present disclosure, the above-mentioned apparatuses configured to provide wireless communication functions for a terminal device 13 are collectively referred to as an access network device.

The terminal device 13 may include various types of processing device having a wireless communication function such as a handheld device, a vehicle-mounted device, a wearable device, a computing device, or another processing device that is connected to a wireless modem, various forms of user equipment, a Mobile Station (MS), a terminal device, etc. For the convenience of description, the above-mentioned devices are collectively referred to as a terminal. An access network device 120 and the terminal device 13 communicate with each other through a certain air interface technology, such as a Uu interface.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, a LTE Time Division Duplex (TDD) system, an Advanced Long Term Evolution (LTE-A) system, a New Radio (NR) system, an evolution system of the NR system, an LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), Vehicle to Vehicle (V2V) communication, and a Vehicle to everything (V2X) system etc. The embodiments of the present disclosure can also be applied to these communication systems.

Figure 2:
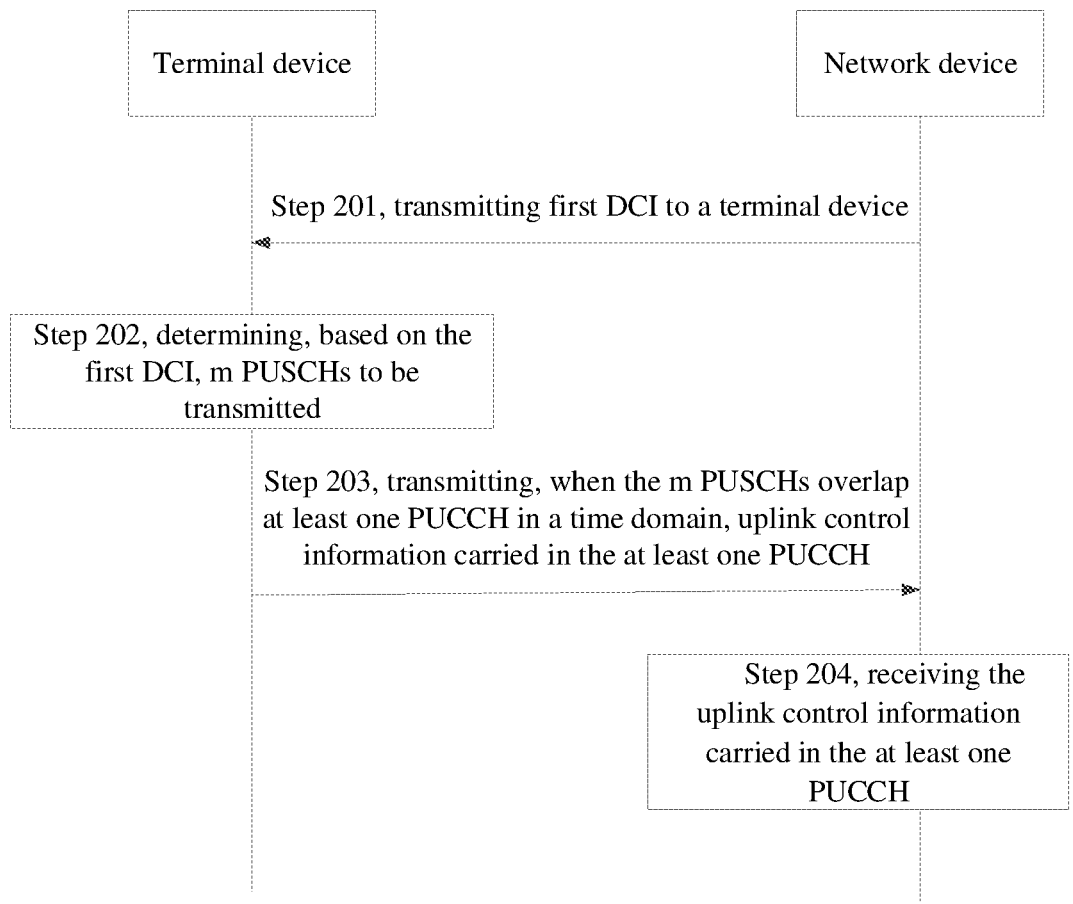
FIG. 2 is a flowchart illustrating a method for transmitting uplink control information according to an exemplary embodiment of the present disclosure.

FIG. 2 is a flowchart illustrating a method for transmitting uplink control information according to an exemplary embodiment of the present disclosure. The method is applied in the terminal device and the network device that are illustrated in FIG. 1, and includes at least some of the following contents.

At block 201, a network device transmits first DCI to a terminal device.

Here, the first DCI is used to schedule m PUSCHs, where m is a positive integer. Optionally, a maximum value of m is 8, and the m PUSCHs are m consecutive PUSCHs in a time domain.

DCI is carried by a PDCCH, and control information transmitted by the network device to the terminal device is used to schedule a PUSCH transmission.

Optionally, the first DCI is one piece of DCI. That is, the network device can schedule, through one piece of DCI, a plurality of PUSCH transmissions.

Optionally, the first DCI are a plurality of pieces of DCI. That is, the network device may schedule, through the plurality of pieces of DCI, a plurality of PUSCH transmissions consecutive in the time domain.

Optionally, the first DCI is uplink scheduling assignment DCI, which is in a non-fallback format 0-1. The non-fallback format 0-1 supports all NR characteristics. In the non-fallback format, the presence or absence of an information field of the first DCI is related to whether the terminal is configured with a corresponding characteristic, and a number of bits and/or a value range of the information field is configurable.

The network device uses the first DCI on the PDCCH to schedule m PUSCHs, and the m PUSCHs are consecutive in the time domain. The m PUSCHs may or may not occupy the same frequency domain resources in a frequency domain, and the present disclosure is not limited in this regard.

Optionally, the PUSCH supports two transmission schemes: codebook-based transmission and non-codebook-based transmission. For the codebook-based transmission, the network device provides a transmission precoding matrix indication in the first DCI to the terminal device, and the terminal device uses the indication to select precoding of the PUSCH from the codebook. For the non-codebook transmission, the terminal device determines the precoding of the PUSCH based on a Sounding Reference Signal Resource Indicator (SRI) field of the first DCI.

At block 202, the terminal device determines, based on the first DCI, m PUSCHs to be transmitted.

As mentioned above, m is a positive integer, and the maximum value of m can be 8.

The terminal device receives the first DCI transmitted downlink by the network device. For example, the first DCI is uplink scheduling assignment DCI, which is in the non-fallback format 0-1, and the terminal device may determine, based on the first DCI, m PUSCHs to be transmitted.

Exemplarily, the terminal device receives the first DCI, and determines, after decoding of the first DCI, 6 PUSCHs that need to be transmitted consecutively in the time domain.

At block 203, the terminal device transmits, when the m PUSCHs overlap at least one PUCCH in a time domain, uplink control information carried in the at least one PUCCH.

The Uplink Control Information (UCI) is control information transmitted by the terminal device to the network device. The UCI may include Channel State Information (CSI), and/or an HARQ feedback for downlink data, e.g., HARQ-ACK information.

Optionally, the at least one PUCCH includes a dynamically scheduled PUCCH. For example, the at least one PUCCH is used to transmit HARQ-ACK information corresponding to a PDSCH scheduled by second DCI, and/or the at least one PUCCH is used to transmit HARQ-ACK information corresponding to an activated semi-static PDSCH, and/or the at least one PUCCH is used to transmit acknowledgement information corresponding to the second DCI.

Optionally, the at least one PUCCH includes a periodic PUCCH. For example, the at least one PUCCH is used to transmit periodic CSI feedback information.

Optionally, when the at least one PUCCH includes a plurality of PUCCHs, the plurality of PUCCHs includes the same uplink control information, or the plurality of PUCCHs are PUCCHs that are transmitted repeatedly.

Optionally, when the at least one PUCCH includes a plurality of PUCCHs, at least two PUCCHs in the plurality of PUCCHs include different uplink control information.

Optionally, the m PUSCHs may overlap the at least one PUCCH in the time domain in one of the following cases.

1) The at least one PUCCH is within a time domain range of the m PUSCHs.

Figure 3A:
FIGS. 3A and 3B are each a schematic diagram showing a transmission conflict according to an exemplary embodiment of the present disclosure.

FIG. 3A illustrates 6 PUSCHs to be transmitted, i.e., PUSCH0, PUSCH1, PUSCH2, PUSCH3, PUSCH4 and PUSCH5, and 2 PUCCHs to be transmitted, i.e., PUCCH0 and PUCCH1. Here, the 2 PUCCHs to be transmitted completely fall within the time domain range of the 6 PUSCHs, i.e., a complete overlap.

2) The at least one PUCCH partially overlaps the time domain range of the m PUSCHs.

Figure 3B:
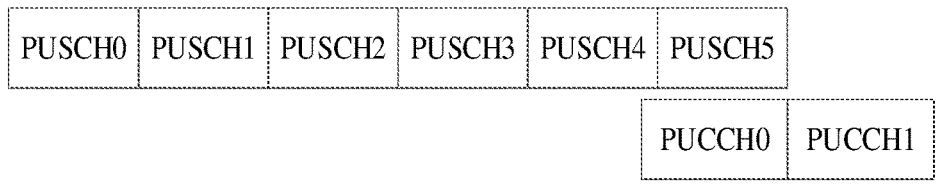

FIG. 3B illustrates 6 PUSCHs to be transmitted, i.e., PUSCH0, PUSCH1, PUSCH2, PUSCH3, PUSCH4 and PUSCH5, and 2 PUCCHs to be transmitted, i.e., PUCCH0 and PUCCH1. Here, only PUCCH0 falls within the time domain range of the 6 PUSCHs, and thus the 2 PUCCHs to be transmitted partially overlap the time domain range of the 6 PUSCHs.

Optionally, the terminal device preferentially transmits the uplink control information carried in the PUCCH, and thus the information carried by the m PUSCHs may be completely or partially transmitted by the terminal device.

At block 204, the network device receives the uplink control information carried in the at least one PUCCH.

Optionally, the network device determines, through receiving the m PUSCHs, the uplink control information carried in the at least one PUCCH, or may also determine, through receiving the at least one PUCCH, the uplink control information carried in the at least one PUCCH.

To sum up, the method provided in this embodiment provides, when the m PUSCHs to be transmitted overlap the at least one PUCCH to be transmitted in the time domain, a solution to a conflict between the m PUSCHs to be transmitted and the at least one PUCCH to be transmitted by transmitting the uplink control information carried in the at least one PUCCH, thereby ensuring effectiveness of transmission of the uplink control information.

Figure 4:
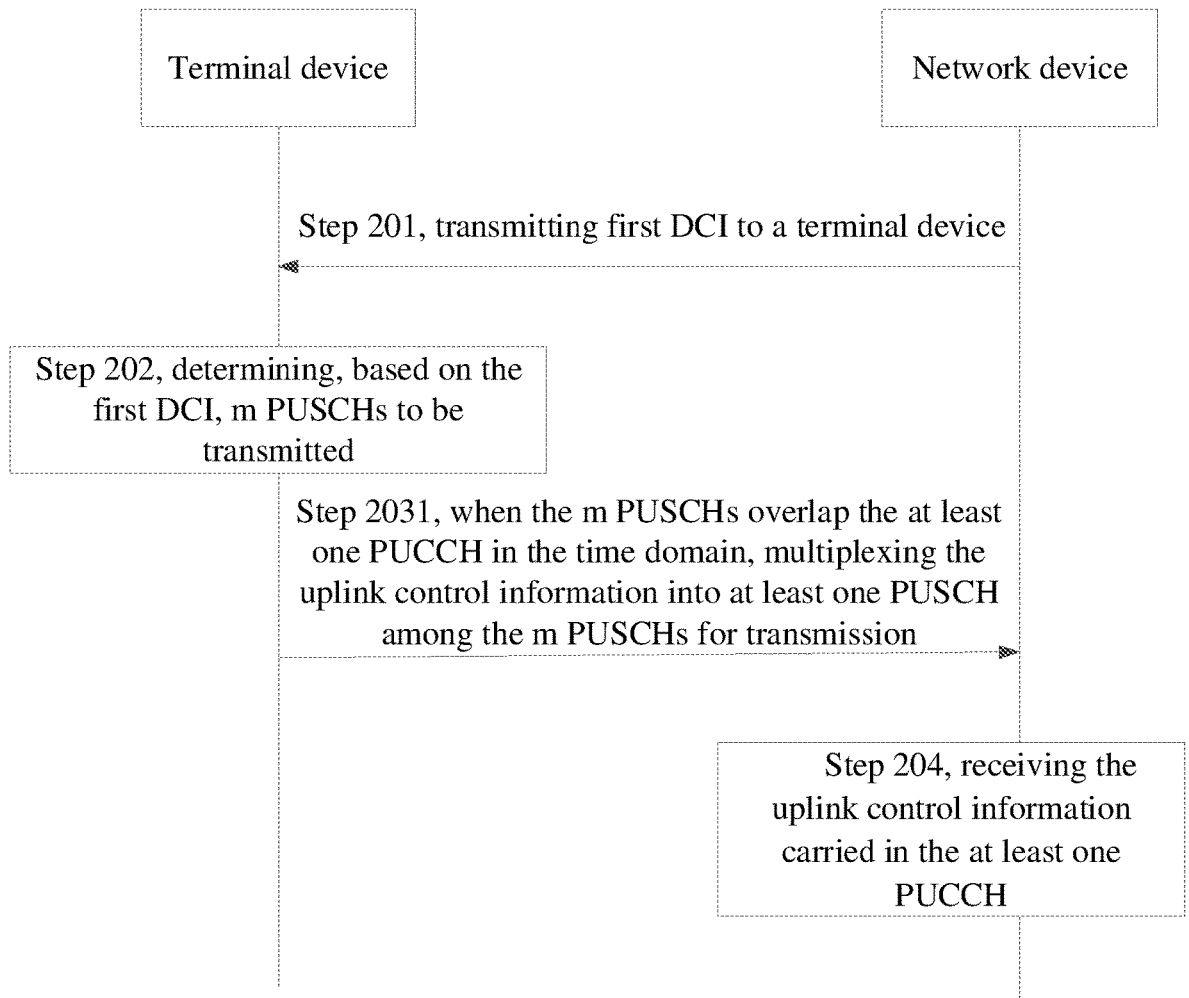
FIG. 4 is a flowchart illustrating a method for transmitting uplink control information according to an exemplary embodiment of the present disclosure.

In an optional embodiment based on FIG. 2, FIG. 4 illustrates a flowchart of a method for transmitting uplink control information according to an exemplary embodiment of the present disclosure. In this embodiment, step 203 is replaced by and implemented as step 2031.

At block 2031, when the m PUSCHs overlap the at least one PUCCH in the time domain, the terminal device multiplexes the uplink control information into at least one PUSCH among the m PUSCHs for transmission.

When the terminal device multiplexes the uplink control information carried in the PUCCH into the at least one PUSCH among the m PUSCHs for transmission, the network device can determine (or decode) the uplink control information through receiving the m PUSCHs.

In an example, the at least one PUSCH includes n PUSCHs, where n is a positive integer smaller than or equal to m. Multiplexing the uplink control information into the at least one PUSCH among the m PUSCHs for transmission includes: multiplexing the uplink control information into at least one first PUSCH among the n PUSCHs.

The at least one first PUSCH are one or more PUSCHs of the n PUSCHs. Optionally, the n PUSCHs are PUSCHs located backwards in the time domain among the m PUSCHs.

In an example, the n PUSCHs are one or more of the m PUSCHs which satisfy a timing requirement.

Optionally, the uplink control information includes HARQ-ACK information. The HARQ-ACK information includes feedback information corresponding to a PDSCH scheduled by second DCI. A PUSCH satisfies the timing requirement when at least one of the following conditions is met.

1) A time difference between a beginning symbol of the PUSCH and an ending symbol of the PDSCH scheduled by the second DCI is greater than first processing time.

Optionally, the first processing time is the PDSCH processing time $T_{proc,1}$. Referring to Equation 2 given above, $T_{proc,1}=\max((N_1+d_{1,1})(2048+144)\cdot\kappa 2^{-\mu}\cdot T_C$.

2) A time difference between a beginning symbol of the PUSCH and an ending symbol of target DCI is greater than second processing time. The target DCI is a later one of the first DCI and the second DCI.

Optionally, the second processing time is the PUSCH preparation time $T_{proc,2}$. Referring to Equation 1 given above, $T_{proc,2}=\max((N_2+d_{2,1})(2048+144)\cdot\kappa 2^{-\mu}\cdot T_C, d_{2,2})$.

Optionally, when a position of an ending symbol of the first DCI in the time domain is earlier than a position of an ending symbol of the second DCI in the time domain, the second DCI is determined as the target DCI. When the position of the ending symbol of the first DCI in the time domain is later than the position of the ending symbol of the second DCI in the time domain, the first DCI is determined as the target DCI.

Optionally, when the m PUSCHs include no n PUSCHs satisfying the timing requirement, the terminal device may not multiplex the HARQ-ACK information carried in the PUCCH into the first PUSCH for transmission.

Here, the HARQ-ACK information is feedback information corresponding to the PDSCH scheduled by the second DCI. The HARQ-ACK information is one type of uplink control information. Optionally, the second DCI is downlink scheduling assignment DCI that schedules the PDSCH, and one or more PDSCHs may be scheduled. It should be noted that the present disclosure does not limit positions of the first DCI and the second DCI in the time domain. That is, the first DCI may be before or after the second DCI. Also, the present disclosure does not limit the format of the first DCI or the second DCI.

In an example, before step 2031, the terminal device receives a first configuration parameter transmitted by the network device. The first configuration parameter is used to indicate whether the terminal device adopts a first transmission mode, and the first transmission mode includes multiplexing the uplink control information into at least one PUSCH among the m PUSCHs for transmission.

Before step 2031, the terminal device may receive a configuration parameter from the network device. When the configuration parameter is the first configuration parameter, and the first configuration parameter indicates that the terminal device adopts the first transmission mode, or when the terminal device is configured with the first configuration parameter (for example, the terminal device being configured with the first configuration parameter means that the terminal device should adopt the first transmission mode), the terminal device performs transmission based on the first transmission mode indicated by the first configuration parameter.

Optionally, before receiving the first configuration parameter transmitted by the network device, the terminal device may also report a capability of the terminal device to the network device. The capability of the terminal device includes supporting the first transmission mode.

To sum up, with the method provided in this embodiment, a specific manner for preferentially transmitting uplink control information is provided by multiplexing the uplink control information carried in the PUCCH into the at least one PUSCH among the m PUSCHs for transmission. By multiplexing the uplink control information for transmission, both transmission of the uplink control information and transmission of information originally carried in the m PUSCHs are guaranteed, thereby effectively solving a problem of transmission conflict.

In addition, with the method provided by this embodiment, the terminal device needs to report its own capability, and then adopts, based on the configuration parameter transmitted by the network device, a transmission mode corresponding to the configuration parameter. Through an interaction between the terminal device and the network device regarding the transmission mode, transmission reliability of the communication system is improved.

In an optional embodiment based on FIG. 4, the at least one PUSCH includes n PUSCHs, and the terminal device multiplexes the uplink control information into the first PUSCH among the n PUSCHs for transmission. According to difference in numbers of the at least one PUCCH to be transmitted that carries the uplink control information, it can be categorized into the following two cases.

1) The at least one PUCCH includes one PUCCH.
2) The at least one PUCCH includes k PUCCHs, where k is an integer greater than 1.

Case 1): The at Least One PUCCH Includes One PUCCH.

In an example, the first PUSCH is a penultimate PUSCH among the n PUSCHs.

In an example, the first PUSCH is an ending PUSCH among the n PUSCHs.

On a shared channel, a communication device needs to detect the channel before signal transmission. Signal transmission can only be performed when the channel is idle, and the signal transmission cannot be performed when the channel is busy. When the terminal device receives a plurality of consecutive scheduled PUSCHs, a channel detection opportunity is available before transmitting each PUSCH, and a certain PUSCH can be transmitted directly when a channel detection passes for a PUSCH before the certain PUSCH. Therefore, among the plurality of PUSCHs, the more backwards a PUSCH is located, the higher a transmission probability of the PUSCH is. When the PUCCH conflicts with the plurality of PUSCHs, on the premise that the timing requirement is satisfied, multiplexing the uplink control information in the PUCCH into a PUSCH as backwards as possible among the plurality of PUSCHs can increase a transmission probability of the uplink control information.

In an example, the first PUSCH is a beginning PUSCH among the n PUSCHs.

When the PUCCH conflicts with the plurality of PUSCHs, on the premise that the timing requirement is satisfied, the uplink control information in the PUCCH is multiplexed into the beginning PUSCH among the plurality of PUSCHs, to enable the network device to process the uplink control information as soon as possible.

Figure 5:
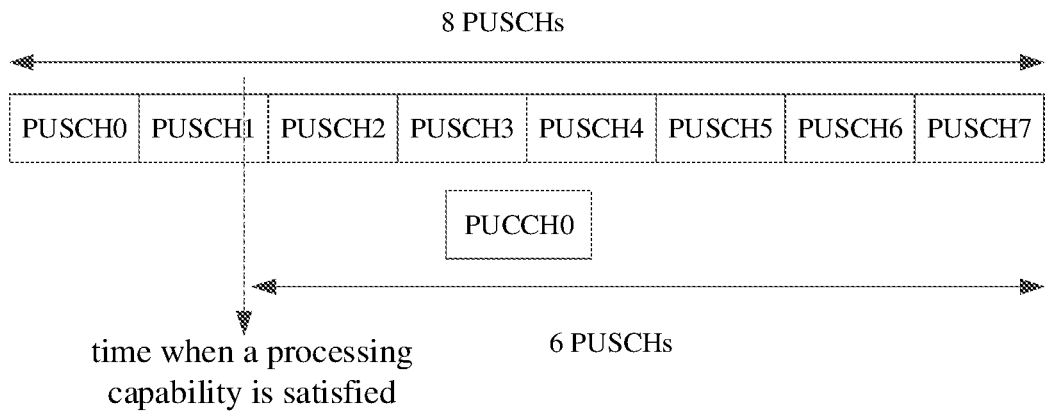
FIG. 5 is a schematic diagram showing transmitting uplink control information according to an exemplary embodiment of the present disclosure.

Exemplarily, as illustrated in FIG. 5, m is 8. That is, the first DCI schedules 8 PUSCHs, including PUSCH0, PUSCH1, PUSCH2, PUSCH3, PUSCH4, PUSCH5, PUSCH6, and PUSCH7, and the PUCCH includes PUCCH0. It can be seen that the 8 PUSCHs are consecutive in the time domain, and the PUSCHs that satisfy the timing requirement include 6 PUSCHs, which are PUSCH2, PUSCH3, PUSCH4, PUSCH5, PUSCH6, and PUSCH7, i.e., n is 6.

When the first PUSCH is the penultimate PUSCH among the n PUSCHs, the first PUSCH is PUSCH6. When the first PUSCH is the ending PUSCH among the n PUSCHs, the first PUSCH is PUSCH7. When the first PUSCH is the beginning PUSCH among the n PUSCHs, the first PUSCH is PUSCH2.

In an example, the at least one PUCCH includes one PUCCH, and the n PUSCHs include a second PUSCH that carries a CSI feedback triggered by the first DCI; and the first PUSCH is determined based on the second PUSCH.

Optionally, the CSI feedback is used to reflect a channel property of a communication link. For example, the CSI feedback describes a fading factor of a signal on each transmission path, i.e., a value of each element in a channel gain matrix H, e.g., information on signal scattering, environmental fading (fading, multipath fading, or shadowing fading), power decay of distance, and the like.

Optionally, the first PUSCH is identical to the second PUSCH; or the first PUSCH is immediately before the second PUSCH; or the first PUSCH is immediately after the second PUSCH; or when n is greater than 2, the first PUSCH is immediately after the second PUSCH; or when n is equal to 2, the first PUSCH is immediately after the second PUSCH or the first PUSCH is identical to the second PUSCH; or when n is equal to 1, the first PUSCH is identical to the second PUSCH.

In a case where the first DCI triggers the CSI feedback, when m≤2, the CSI feedback is carried on a PUSCH among the m PUSCHs that is scheduled last; and when m>2, the CSI feedback is carried on a PUSCH among the m PUSCHs that is scheduled penultimately.

Optionally, when the first PUSCH is identical to the second PUSCH, the terminal device may preferentially transmit, in the first PUSCH (second PUSCH), the HARQ-ACK information in the uplink control information, and may also transmit the CSI feedback when the first PUSCH (the second PUSCH) still has idle control information transmission resources.

Figure 6:
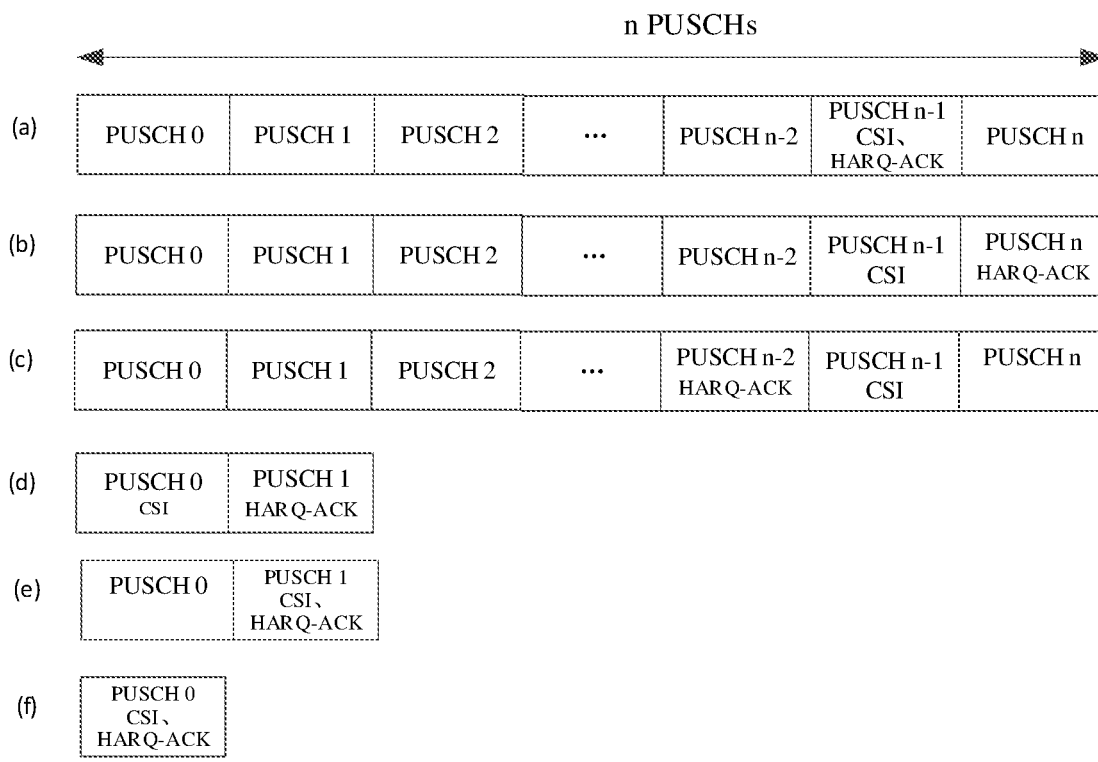
FIG. 6 is a schematic diagram showing transmitting uplink control information according to an exemplary embodiment of the present disclosure.

Exemplarily, as illustrated in (a) of FIG. 6, both the first PUSCH and the second PUSCH are the PUSCH (n-1) that is scheduled penultimately. Thus, the terminal device transmits priority uplink control information in the PUSCH (n-1), and may also transmit the CSI feedback when PUSCH (n-1) still has idle control information transmission resources.

Optionally, the first PUSCH is immediately before the second PUSCH.

When m=2, the CSI feedback is carried on the PUSCH among the m PUSCHs that is scheduled last, and thus the first PUSCH may be immediately before the second PUSCH, i.e., the PUSCH that is scheduled penultimately. Or, when m>2, the CSI feedback is carried on the PUSCH among the m PUSCHs that is scheduled penultimately, and thus the first PUSCH may be immediately before the second PUSCH, i.e., a PUSCH that is scheduled antepenultimately.

Exemplarily, referring to (c) in FIG. 6, the second PUSCH is PUSCH (n-1), the first PUSCH is PUSCH (n-2), and the first PUSCH is immediately before the second PUSCH. For another example, when both m and n are equal to 2, the second PUSCH is PUSCH 1, the first PUSCH is PUSCH 0, and the first PUSCH is immediately before the second PUSCH.

Optionally, the first PUSCH is immediately after the second PUSCH.

When m>2, the CSI feedback is carried on the PUSCH among the m PUSCHs that is scheduled penultimately, and thus the first PUSCH may be immediately after the second PUSCH, i.e., the PUSCH that is scheduled last.

Exemplarily, referring to (b) in FIG. 6, the second PUSCH is PUSCH (n-1), the first PUSCH is PUSCH n, and the first PUSCH is immediately after the second PUSCH.

Optionally, when n is greater than 2, the first PUSCH is immediately after the second PUSCH.

When n is greater than 2, since n is smaller than m, m is also greater than 2. In this case, the CSI feedback should be carried on the PUSCH among the m PUSCHs that is scheduled penultimately. Therefore, the first PUSCH may be immediately after the second PUSCH, i.e., the PUSCH that is scheduled last.

Exemplarily, referring to (b) in FIG. 6, the second PUSCH is PUSCH (n-1), the first PUSCH is PUSCH n, and the first PUSCH is immediately after the second PUSCH.

Optionally, when n is equal to 2, the first PUSCH is immediately after the second PUSCH or the first PUSCH is identical to the second PUSCH.

When n is equal to 2, m may be equal to or greater than 2. When m is greater than 2, the second PUSCH is the PUSCH that is scheduled penultimately, the first PUSCH is the PUSCH that is scheduled last, and the first PUSCH is immediately after the second PUSCH. When m is equal to 2, the second PUSCH is the PUSCH that is scheduled last, and thus the first PUSCH is also the PUSCH that is scheduled last, and the first PUSCH is identical to the second PUSCH.

Exemplarily, referring to (d) in FIG. 6, m is greater than 2, n is equal to 2, the second PUSCH is PUSCH 0, the first PUSCH is PUSCH 1, and the first PUSCH is immediately after the second PUSCH. Referring to (e) in FIG. 6, n is equal to 2, m is also equal to 2, the second PUSCH is PUSCH 1, the first PUSCH is also PUSCH 1, and the first PUSCH is identical to the second PUSCH.

Optionally, when n is equal to 1, the first PUSCH is identical to the second PUSCH.

In a case where n is equal to 1, when the n PUSCHs include the second PUSCH, the second PUSCH is the ending PUSCH in the m PUSCHs, and the first PUSCH may be identical to the second PUSCH.

Exemplarily, referring to (f) in FIG. 6, n is equal to 1, the second PUSCH is PUSCH 0, the first PUSCH is PUSCH 0, and the first PUSCH is identical to the second PUSCH.

In an example, the at least one PUCCH includes one PUCCH; at least one of the m PUSCHs other than the n PUSCHs includes a second PUSCH that carries a CSI feedback triggered by the first DCI; and the first PUSCH is an ending PUSCH among the n PUSCHs.

Figure 7:
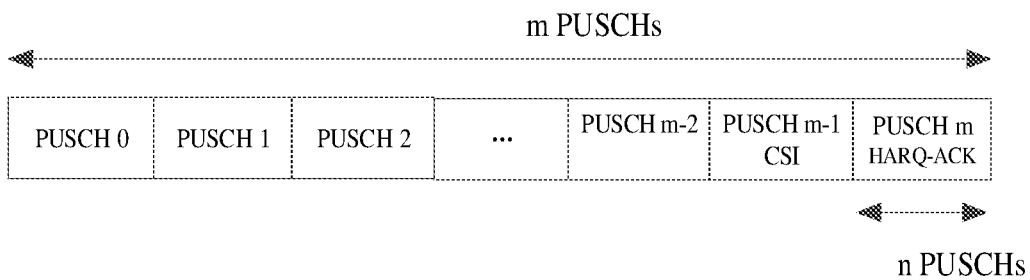
FIG. 7 is a schematic diagram showing transmitting uplink control information according to an exemplary embodiment of the present disclosure.

With reference to FIG. 7, the second PUSCH is PUSCH (m-1), and the second PUSCH carries the CSI feedback triggered by the first DCI. n is 1, and the second PUSCH is one of the m PUSCHs other than the n PUSCHs. Therefore, the terminal device determines the first PUSCH as PUSCH m, and PUSCH m is the ending PUSCH among the n PUSCHs.

Case 2) the at Least One PUCCH Includes k PUCCHs.

In an example, the at least one PUCCH includes k PUCCHs, and the at least one first PUSCH are k PUSCHs among the n PUSCHs, where k and n are positive integers greater than 1, and k is greater than n. Multiplexing the uplink control information into the at least one first PUSCH among the n PUSCHs includes: multiplexing uplink control information carried in n PUCCHs among the k PUCCHs into the n PUSCHs, and transmitting remaining (k-n) PUCCHs.

Optionally, the k PUCCHs transmit different uplink control information.

Illustratively, n is 3, k is 4, and 4 PUCCHs transmit different uplink control information. The terminal device multiplexes uplink control information carried in 3 PUCCHs among the 4 PUCCHs into 3 PUSCHs for transmission, and transmits the remaining 1 PUCCH.

In an example, the at least one PUCCH includes k PUCCHs, and the at least one first PUSCH are k PUSCHs among the n PUSCHs, where k and n are positive integers greater than 1, and k is smaller than or equal to n. The at least one first PUSCH are k consecutive PUSCHs among the n PUSCHs; or the at least one first PUSCH are k ending PUSCHs among the n PUSCHs; or the at least one first PUSCH are k beginning PUSCHs among the n PUSCHs; or the at least one first PUSCH are k consecutive PUSCHs among the n PUSCHs, and an ending PUSCH among the k consecutive PUSCHs is a penultimate PUSCH among the n PUSCHs.

Figure 8:
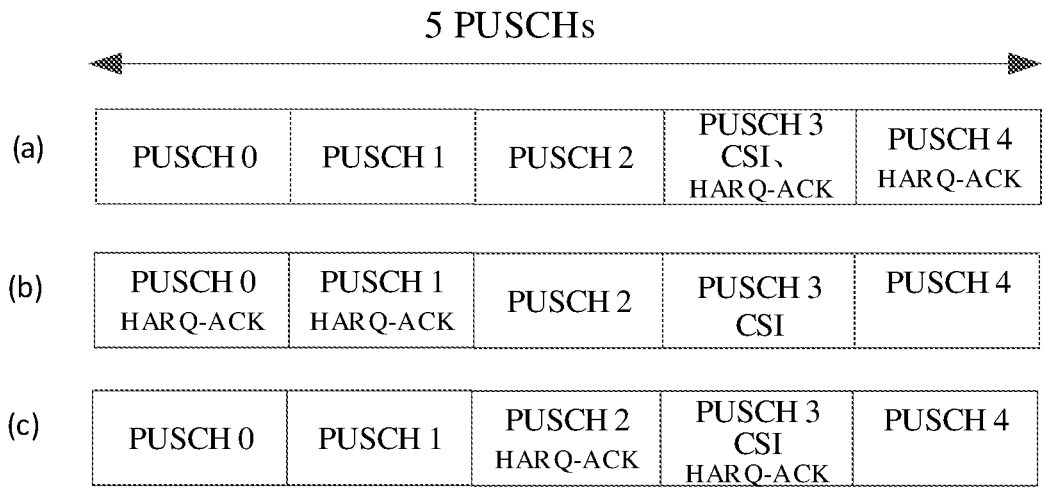
FIG. 8 is a schematic diagram showing transmitting uplink control information according to an exemplary embodiment of the present disclosure.

Exemplarily, with reference to FIG. 8, k is 2 and n is 5.

The at least one first PUSCH are 2 consecutive PUSCHs among the 5 PUSCHs, as illustrated in (a), (b), and (c) in FIG. 8.

When the at least one first PUSCH are 2 ending PUSCHs among the 5 PUSCHs, as illustrated in (a) in FIG. 8, the at least one first PUSCH are PUSCH 3 and PUSCH 4.

When the at least one first PUSCH are 2 beginning PUSCHs among the 5 PUSCHs, as illustrated in (b) of FIG. 8, the at least one first PUSCH are PUSCH 0 and PUSCH 1.

When the at least one first PUSCH are the penultimate PUSCH and the antepenultimate PUSCH among the n PUSCHs, the at least one first PUSCH are PUSCH 2 and PUSCH 3.

Figure 9:
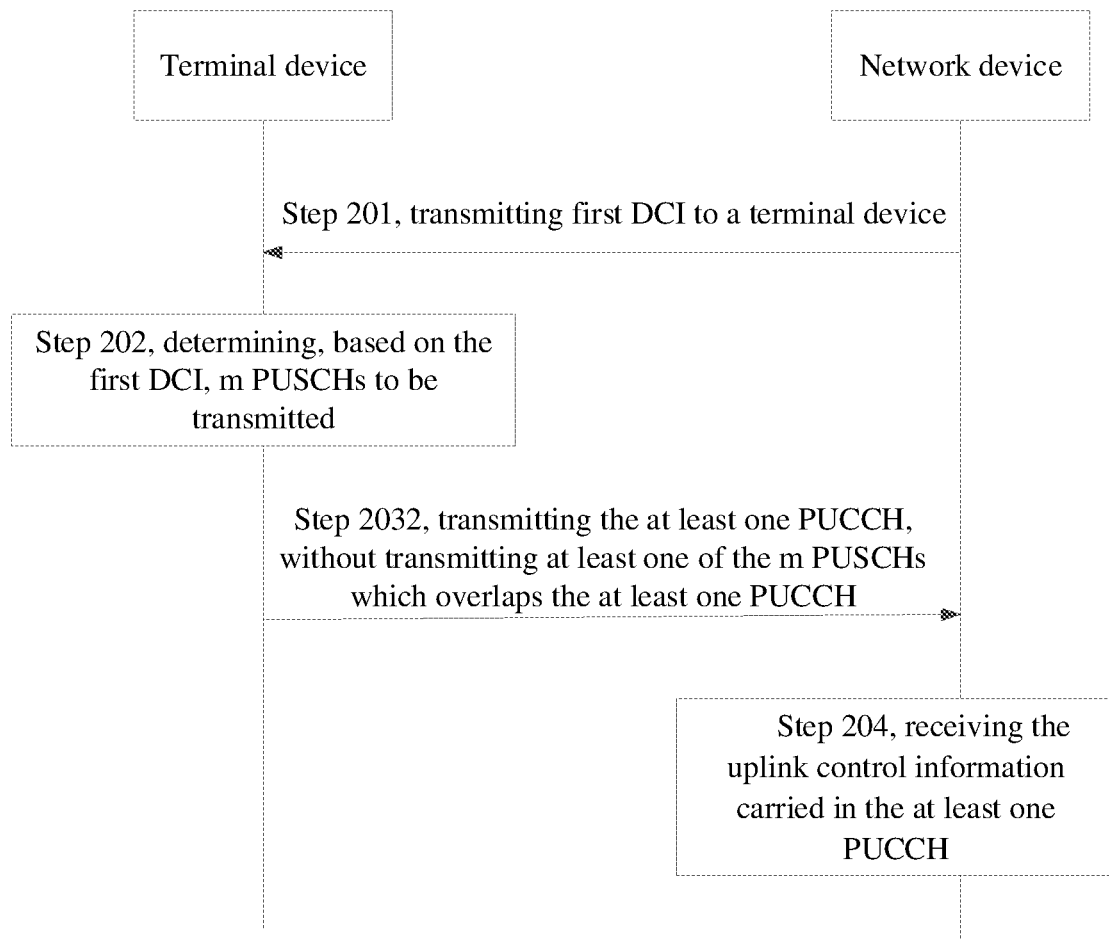
FIG. 9 is a flowchart illustrating a method for transmitting uplink control information according to an exemplary embodiment of the present disclosure.

In an optional embodiment based on FIG. 2, FIG. 9 illustrates a flowchart of a method for transmitting uplink control information according to an exemplary embodiment of the present disclosure. In this embodiment, step 203 is replaced by and implemented as step 2032.

At block 2032, the terminal device transmits the at least one PUCCH, without transmitting at least one of the m PUSCHs which overlaps the at least one PUCCH.

In an example, transmitting the at least one PUCCH, without transmitting the at least one of the m PUSCHs which overlaps the at least one PUCCH, includes: when the m PUSCHs include no PUSCH that satisfies a timing requirement, transmitting the at least one PUCCH, without transmitting the at least one of the m PUSCHs which overlaps the at least one PUCCH; or when the m PUSCHs include n first PUSCHs that satisfy the timing requirement, and a first number n of the n PUSCHs is smaller than a second number k of the at least one PUCCH, transmitting the at least one PUCCH, without transmitting the at least one of the m PUSCHs which overlaps the at least one PUCCH.

Optionally, the second number of PUCCHs repeatedly transmit the same uplink control information.

Figure 10:
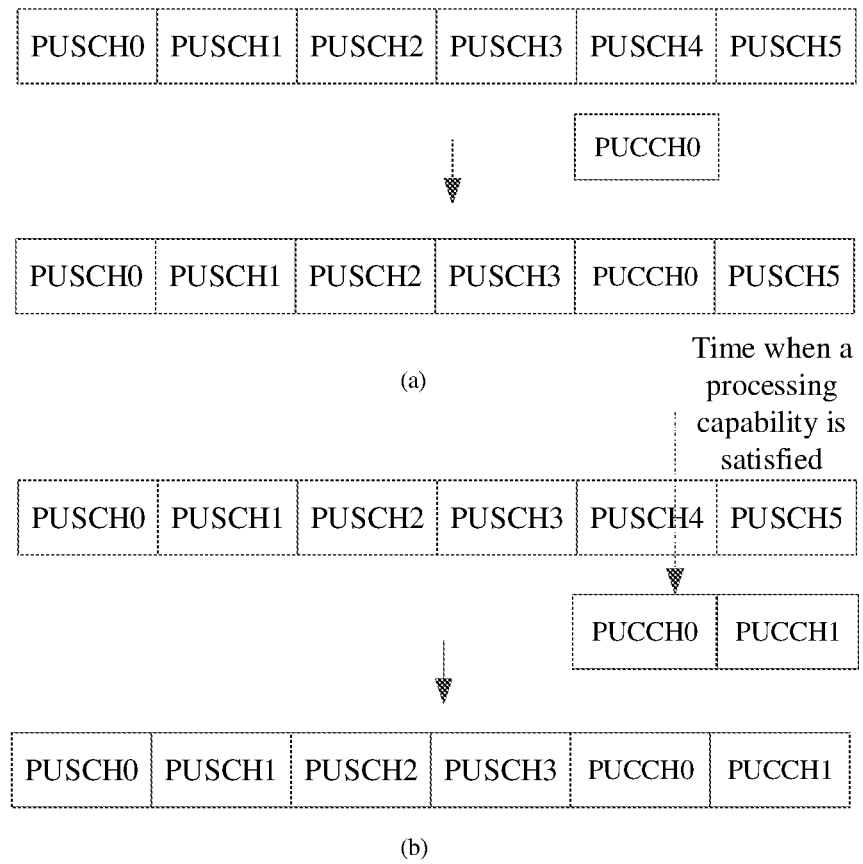
FIG. 10 is a schematic diagram showing transmitting uplink control information according to an exemplary embodiment of the present disclosure.

Exemplarily, as illustrated in (a) of FIG. 10, m is 6, the 6 PUSCHs include no first PUSCH that satisfies the timing requirement, the PUCCH is PUCCH0, and PUSCH4 of the 6 PUSCHs overlaps PUCCH0. The terminal device transmits PUSCH0, PUSCH1, PUSCH2, PUSCH3, PUCCH0, and PUSCH5, and the terminal device abandons transmission of PUSCH4 overlapping PUCCH0.

As illustrated in (b) of FIG. 10, m is 6, the first number n of the at least one first PUSCH is 1, the second number k of the at least one PUCCH is 2, and the first number n is smaller than the second number k. The terminal device transmits PUSCH0, PUSCH1, PUSCH2, PUSCH3, PUCCH0 and PUCCH1, and the terminal device abandons transmission of PUSCH4 and PUSCH5 that overlap PUCCH0 and PUCCH1.

In an example, the n PUSCHs are one or more of the m PUSCHs which satisfy the timing requirement.

When the uplink control information includes HARQ-ACK information, and the HARQ-ACK information includes feedback information corresponding to a PDSCH scheduled by second DCI, a PUSCH satisfies the timing requirement when at least one of the following conditions is met.

1) A time difference between a beginning symbol of the PUSCH and an ending symbol of the PDSCH scheduled by the second DCI is greater than first processing time.

Optionally, the first processing time is the PDSCH processing time $T_{proc,1}$. Referring to Equation 2 given above, $T_{proc,1} = \max((N_1 + d_{1,1})(2048+144) \cdot \kappa 2^{-\mu} \cdot T_C$.

2) A time difference between a beginning symbol of the PUSCH and an ending symbol of target DCI is greater than second processing time. The target DCI is a later one of the first DCI and the second DCI.

Optionally, the second processing time is the PUSCH preparation time $T_{proc,2}$.

Referring to Equation 1 given above, $T_{proc,2} = \max((N_2 + d_{2,1})(2048+144) \cdot \kappa 2^{-\mu} \cdot T_C, d_{2,2})$.

Optionally, when a position of an ending symbol of the first DCI in the time domain is earlier than a position of an ending symbol of the second DCI in the time domain, the second DCI is determined as the target DCI. When the position of the ending symbol of the first DCI in the time domain is later than the position of the ending symbol of the second DCI in the time domain, the first DCI is determined as the target DCI.

In an example, before step 2032, the terminal device receives the first configuration parameter transmitted by the network device. The first configuration parameter is used to indicate whether the terminal device adopts a second transmission mode, and the second transmission mode includes transmitting the at least one PUCCH, without transmitting at least one of the m PUSCHs which overlaps the at least one PUCCH.

Before step 2032, the terminal device may receive the configuration parameter from the network device. When the configuration parameter is the first configuration parameter and the first parameter indicates that the terminal device adopts the second transmission mode, transmission is performed based on the second transmission mode indicated by the first configuration parameter.

Optionally, before receiving the first configuration parameter transmitted by the network device, the terminal device may also report the capability of the terminal device to the network device. The capability of the terminal device includes supporting the second transmission mode.

It should be noted that the network device may also be configured with two configuration parameters: a second configuration parameter and a third configuration parameter. Here, the second configuration parameter indicates that the terminal device adopts the above-mentioned first transmission mode, and the third configuration parameter indicates that the terminal device adopts the second transmission mode.

To sum up, with the method provided in this embodiment, a specific manner for preferentially transmitting the uplink control information is provided through abandoning, by the terminal device, the transmission of at least one of the m PUSCHs which overlaps the at least one PUCCH, thereby ensuring the transmission of the uplink control information, and effectively solving a problem of transmission conflict.

In addition, with the method provided by this embodiment, the terminal device needs to report its own capability, and then adopts, based on the configuration parameter transmitted by the network device, a transmission mode corresponding to the configuration parameter. Through an interaction between the terminal device and the network device regarding the transmission mode, transmission reliability of the communication system is improved.

Figure 11:
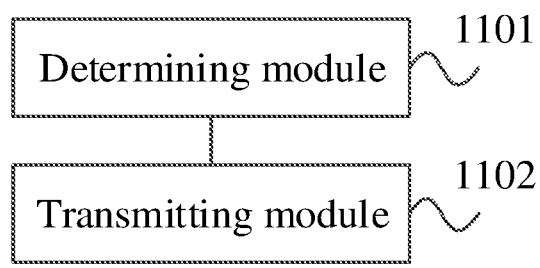
FIG. 11 is a block diagram showing an apparatus for transmitting uplink control information according to an exemplary embodiment of the present disclosure.

FIG. 11 illustrates a block diagram showing an apparatus for transmitting uplink control information according to an exemplary embodiment of the present disclosure. The apparatus is applied in the terminal device illustrated in FIG. 1 and includes a determining module 1101 and a transmitting module 1102.

The determining module 1101 is configured to determine, based on first DCI, m PUSCHs to be transmitted, where m is a positive integer.

The transmitting module 1102 is configured to transmit, when the m PUSCHs overlap at least one PUCCH in a time domain, uplink control information carried in the at least one PUCCH.

In an example, the transmitting module 1102 is configured to multiplex the uplink control information into at least one PUSCH among the m PUSCHs for transmission; or the transmitting module 1102 is configured to transmit the at least one PUCCH, without transmitting at least one of the m PUSCHs which overlaps the at least one PUCCH.

In an example, the at least one PUSCH includes n PUSCHs, where n is a positive integer smaller than or equal to m. The transmitting module 1102 is configured to multiplex the uplink control information into at least one first PUSCH among the n PUSCHs.

In an example, the at least one PUCCH includes one PUCCH. The first PUSCH is a penultimate PUSCH among the n PUSCHs; or the first PUSCH is an ending PUSCH among the n PUSCHs; or the first PUSCH is a beginning PUSCH among the n PUSCHs.

In an example, the at least one PUCCH includes one PUCCH, and the n PUSCHs include a second PUSCH that carries a CSI feedback triggered by the first DCI; and the first PUSCH is determined based on the second PUSCH.

In an example, the first PUSCH is identical to the second PUSCH; or the first PUSCH is immediately before the second PUSCH; or the first PUSCH is immediately after the second PUSCH; or when n is greater than 2, the first PUSCH is immediately after the second PUSCH; or when n is equal to 2, the first PUSCH is immediately after the second PUSCH or the first PUSCH is identical to the second PUSCH; or when n is equal to 1, the first PUSCH is identical to the second PUSCH.

In an example, the at least one PUCCH includes one PUCCH, and at least one of the m PUSCHs other than the n PUSCHs includes a second PUSCH that carries a CSI feedback triggered by the first DCI; and the first PUSCH is an ending PUSCH among the n PUSCHs.

In an example, the at least one PUCCH includes k PUCCHs, and the at least one first PUSCH are k PUSCHs among the n PUSCHs, where k and n are positive integers greater than 1, and k is smaller than or equal to n.

In an example, the at least one first PUSCH are k consecutive PUSCHs among the n PUSCHs; or the at least one first PUSCH are k ending PUSCHs among the n PUSCHs; or the at least one first PUSCH are k beginning PUSCHs among the n PUSCHs; or the at least one first PUSCH are k consecutive PUSCHs among the n PUSCHs, and an ending PUSCH among the k consecutive PUSCHs is a penultimate PUSCH among the n PUSCHs.

In an example, the at least one PUCCH includes k PUCCHs, and the at least one first PUSCH are k PUSCHs among the n PUSCHs, where k and n are positive integers greater than 1, and k is greater than n. The transmitting module 1102 is configured to multiplex uplink control information carried in n PUCCHs among the k PUCCHs into the n PUSCHs, and transmit remaining (k-n) PUCCHs.

In an example, the n PUSCHs are one or more of the m PUSCHs which satisfy a timing requirement.

In an example, the transmitting module 1102 is configured to, when the m PUSCHs include no first PUSCH that satisfies a timing requirement, transmit the at least one PUCCH, without transmitting the at least one of the m PUSCHs which overlaps the at least one PUCCH; or the transmitting module 1102 is configured to, when the m PUSCHs include n PUSCHs that satisfy the timing requirement, and a first number n of the n PUSCHs is smaller than a second number k of the at least one PUCCH, transmit the at least one PUCCH, without transmitting the at least one of the m PUSCHs which overlaps the at least one PUCCH.

In an example, the uplink control information includes HARQ-ACK information, the HARQ-ACK information includes feedback information corresponding to a PDSCH scheduled by second DCI, and the timing requirement includes at least one of the following conditions: a time difference between a beginning symbol of a PUSCH and an ending symbol of the PDSCH scheduled by the second DCI is greater than first processing time; or a time difference between a beginning symbol of the PUSCH and an ending symbol of target DCI is greater than second processing time, the target DCI being a later one of the first DCI and the second DCI.

In an example, the transmitting module 1102 is configured to receive a first configuration parameter transmitted by a network device. The first configuration parameter is used to indicate whether the terminal device adopts a first transmission mode, and the first transmission mode includes multiplexing the uplink control information into at least one PUSCH among the m PUSCHs for transmission.

In an example, the transmitting module 1102 is configured to report a capability of the terminal device to the network device. The capability of the terminal device includes supporting the first transmission mode.

In an example, the first configuration parameter is further used to indicate whether the terminal device adopts a second transmission mode, and the second transmission mode includes transmitting the at least one PUCCH, without transmitting at least one of the m PUSCHs which overlaps the at least one PUCCH.

In an example, the uplink control information includes at least one of HARQ-ACK information and CSI feedback information.

Figure 12:
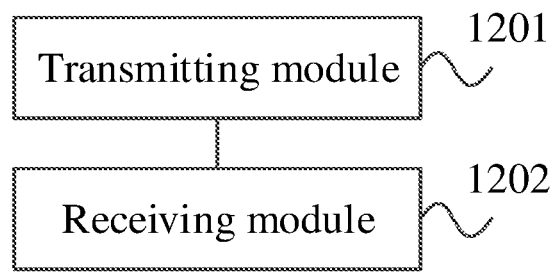
FIG. 12 is a block diagram showing an apparatus for transmitting uplink control information according to an exemplary embodiment of the present disclosure.

FIG. 12 illustrates a block diagram showing an apparatus for transmitting uplink control information according to an exemplary embodiment of the present disclosure. The apparatus is applied in the network device illustrated in FIG. 1 and includes a transmitting module 1201 and a receiving module 1202.

The transmitting module 1201 is configured to transmit first DCI to a terminal device. The first DCI is used to schedule m PUSCHs, where m is a positive integer.

The receiving module 1202 is configured to receive, when the m PUSCHs overlap at least one PUCCH in a time domain, uplink control information that is carried in the at least one PUCCH and preferentially transmitted by the terminal device.

In an example, the receiving module 1202 is configured to receive the m PUSCHs transmitted by the terminal device, the uplink control information being multiplexed and transmitted in at least one PUSCH among the m PUSCHs; or the receiving module 1202 is configured to receive the at least one PUCCH transmitted by the terminal device, without receiving at least one of the m PUSCHs which overlaps the at least one PUCCH.

In an example, the at least one PUSCH includes n PUSCHs, where n is a positive integer smaller than or equal to m. The receiving module 1202 is configured to receive the n PUSCHs transmitted by the terminal device, the uplink control information being multiplexed and transmitted in at least one first PUSCH among the n PUSCHs.

In an example, the at least one PUCCH includes one PUCCH. The first PUSCH is a penultimate PUSCH among the n PUSCHs; or the first PUSCH is an ending PUSCH among the n PUSCHs; or the first PUSCH is a beginning PUSCH among the n PUSCHs.

In an example, the at least one PUCCH includes one PUCCH; the n PUSCHs include a second PUSCH that carries a CSI feedback triggered by the first DCI; and the first PUSCH is determined based on the second PUSCH.

In an example, the first PUSCH is identical to the second PUSCH; or the first PUSCH is immediately before the second PUSCH; or the first PUSCH is immediately after the second PUSCH; or when n is greater than 2, the first PUSCH is immediately after the second PUSCH; or when n is equal to 2, the first PUSCH is immediately after the second PUSCH or the first PUSCH is identical to the second PUSCH; or when n is equal to 1, the first PUSCH is identical to the second PUSCH.

In an example, the at least one PUCCH includes one PUCCH; at least one of the m PUSCHs other than the n PUSCHs includes a second PUSCH that carries a CSI feedback triggered by the first DCI; and the first PUSCH is an ending PUSCH among the n PUSCHs.

In an example, the at least one PUCCH includes k PUCCHs; and the m PUSCHs include n PUSCHs that satisfy a timing requirement, and the at least one first PUSCH are k PUSCHs among the n PUSCHs, where k and n are integers greater than 1, and k is smaller than or equal to n.

In an example, the at least one first PUSCH are k consecutive PUSCHs among the n PUSCHs; or the at least one first PUSCH are k ending PUSCHs among the n PUSCHs; or the at least one first PUSCH are k beginning PUSCHs among the n PUSCHs; or the at least one first PUSCH are k consecutive PUSCHs among the n PUSCHs, and an ending PUSCH among the k consecutive PUSCHs is a penultimate PUSCH among the n PUSCHs.

In an example, the at least one PUCCH includes k PUCCHs; the at least one first PUSCH are k PUSCHs among the n PUSCHs; the uplink control information is multiplexed and transmitted in the k PUSCHs, where k and n are integers greater than 1, and k is greater than n. The receiving module 1202 is configured to receive remaining (k-n) PUCCHs transmitted by the terminal device.

In an example, the n PUSCHs are one or more of the m PUSCHs which satisfy a timing requirement.

In an example, the receiving module 1202 is configured to, when the m PUSCHs include no PUSCH that satisfies a timing requirement, receive the at least one PUCCH, without receiving the at least one of the m PUSCHs which overlaps the at least one PUCCH; or the receiving module 1202 is configured to, when the m PUSCHs include n PUSCHs that satisfy the timing requirement, and a first number n of the n PUSCHs is smaller than a second number k of the at least one PUCCH, receive the at least one PUCCH, without receiving the at least one of the m PUSCHs which overlaps the at least one PUCCH.

In an example, the uplink control information includes HARQ-ACK information, the HARQ-ACK information includes feedback information corresponding to a PDSCH scheduled by second DCI, and the timing requirement includes at least one of the following conditions: a time difference between a beginning symbol of a PUSCH and an ending symbol of the PDSCH scheduled by the second DCI is greater than first processing time; or a time difference between a beginning symbol of the PUSCH and an ending symbol of target DCI is greater than second processing time, the target DCI being a later one of the first DCI and the second DCI.

In an example, the transmitting module 1201 is configured to transmit a first configuration parameter to the terminal device. The first configuration parameter is used to indicate whether the terminal device adopts a first transmission mode, and the first transmission mode includes multiplexing the uplink control information into at least one PUSCH among the m PUSCHs for transmission.

In an example, the receiving module 1202 is configured to receive a capability of the terminal device reported by the terminal device, the capability of the terminal device including supporting the first transmission mode; and the transmitting module 1201 is configured to transmit the first configuration parameter to the terminal device based on the capability of the terminal device.

In an example, the transmitting module 1201 is configured to transmit a second configuration parameter to the terminal device. The second configuration parameter is used to indicate the terminal device to adopt a second transmission mode, and the second transmission mode includes transmitting the at least one PUCCH, and abandoning transmission of at least one first PUSCH among the m PUSCHs which overlaps the at least one PUCCH.

In an example, the receiving module 1202, the first configuration parameter is further used to indicate whether the terminal device adopts a second transmission mode, and the second transmission mode includes transmitting the at least one PUCCH, without transmitting at least one of the m PUSCHs which overlaps the at least one PUCCH.

In an example, the uplink control information includes at least one of HARQ-ACK information and CSI feedback information.

Figure 13:
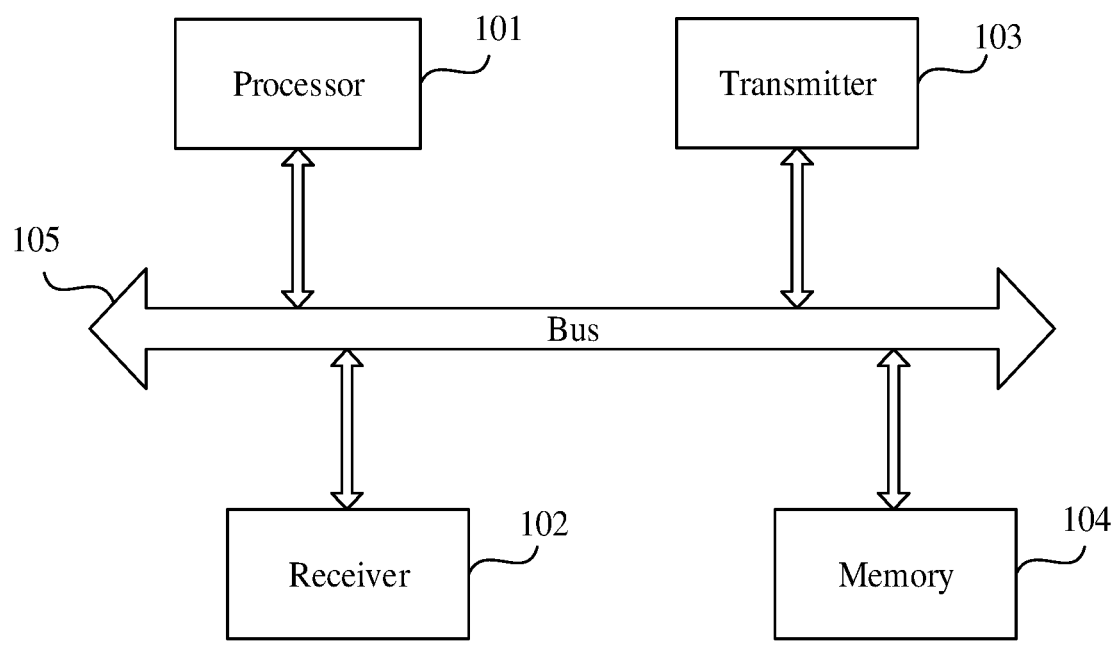
FIG. 13 is a schematic diagram showing a structure of a communication device according to an exemplary embodiment of the present disclosure.

FIG. 13 illustrates a schematic diagram showing a structure of a communication device (a terminal device or a network device) according to an exemplary embodiment of the present disclosure. The communication device includes a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 can be implemented as one communication component. The communication component can be a communication chip.

The memory 104 is connected to the processor 101 through the bus 105.

The memory 104 can be used to store at least one instruction. The processor 101 is configured to execute the at least one instruction, so as to implement each operation in the above method embodiments.

In addition, the memory 104 may be implemented by any type of volatile or non-volatile storage device or a combination thereof. The volatile or non-volatile storage device includes, but is not limited to, a magnetic disk or an optical disc, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, a Programmable Read-Only Memory (PROM).

In an exemplary embodiment, a computer-readable storage medium is further provided. At least one instruction, at least one segment of a program, a set of codes, or a set of instructions is stored on the computer-readable storage medium, and is loaded and executed by the processor to perform the method for transmitting uplink control information implemented by the communication device according to the method embodiments described above.

A person skilled in the art can understand that all or a part of the operations in the above embodiments can be implemented by hardware, or by relevant hardware instructed by a program. The program can be stored in a computer-readable storage medium. The above storage medium may be a read-only memory, a magnetic disk, an optical disc or the like.

The above are only optional embodiments of the present disclosure, and are not intended to limit the present disclosure. Any modification, equivalent replacement, improvement, etc. made within the spirit and principle of the present disclosure shall be included in the protection scope of the present disclosure.

What is claimed is:

1. A method for transmitting uplink control information, applied in a terminal device, the method comprising:
   determining, based on first Downlink Control Information (DCI), m Physical Uplink Shared Channels (PUSCHs) to be transmitted, where m is a positive integer;
   receiving a first configuration parameter transmitted by a network device, wherein the first configuration parameter is used to indicate whether the terminal device adopts a first transmission mode, and the first transmission mode comprises multiplexing uplink control information into n PUSCHs among the m PUSCHs for transmission, where n is a positive integer smaller than or equal to m; and
   multiplexing the uplink control information carried in at least one Physical Uplink Control Channel (PUCCH) into the n PUSCHs for transmission, or transmitting the at least one PUCCH, without transmitting at least one of the m PUSCHs which overlaps the at least one PUCCH, when the at least one PUCCH partially overlaps a time domain range of the m PUSCHs.

2. The method according to claim 1, wherein
said multiplexing the uplink control information carried in at least one PUCCH into the n PUSCHs for transmission comprises:
   multiplexing the uplink control information into at least one first PUSCH among the n PUSCHs.

3. The method according to claim 2, wherein a number of the PUCCH is one, wherein
   the first PUSCH is a penultimate PUSCH among the n PUSCHs; or
   the first PUSCH is an ending PUSCH among the n PUSCHs; or
   the first PUSCH is a beginning PUSCH among the n PUSCHs.

4. The method according to claim 2, wherein a number of the PUCCH is one, and the n PUSCHs comprise a second PUSCH that carries a Channel State Information (CSI) feedback triggered by the first DCI; and
   the first PUSCH is determined based on the second PUSCH.

5. The method according to claim 2, wherein a number of the PUCCH is k, and the at least one first PUSCH is k PUSCHs among the n PUSCHs, where k and n are positive integers greater than 1, and k is smaller than or equal to n.

6. The method according to claim 2, wherein a number of the PUCCH is k, and the at least one first PUSCH is k PUSCHs among the n PUSCHs, where k and n are positive integers greater than 1, and k is greater than n; and
   said multiplexing the uplink control information into the at least one first PUSCH among the n PUSCHs comprises:
   multiplexing uplink control information carried in n PUCCHs among the k PUCCHs into the n PUSCHs, and transmitting remaining k-n PUCCHs.

7. The method according to claim 2, wherein the n PUSCHs are one or more of the m PUSCHs which satisfy a timing requirement.

8. The method according to claim 7, wherein the uplink control information comprises Hybrid Automatic Repeat reQuest-Acknowledgement (HARQ-ACK) information, the HARQ-ACK information comprises feedback information corresponding to a Physical Downlink Shared Channel (PDSCH) scheduled by second DCI, and a PUSCH satisfies the timing requirement when at least one of the following conditions is met:
   a time difference between a beginning symbol of the PUSCH and an ending symbol of the PDSCH scheduled by the second DCI is greater than first processing time; or
   a time difference between a beginning symbol of the PUSCH and an ending symbol of target DCI is greater than second processing time, wherein the target DCI is a later one of the first DCI and the second DCI.

9. The method according to claim 1, wherein said transmitting the at least one PUCCH, without transmitting the at least one of the m PUSCHs which overlaps the at least one PUCCH, comprises:
   when the m PUSCHs comprise no PUSCH that satisfies a timing requirement, transmitting the at least one PUCCH, without transmitting the at least one of the m PUSCHs which overlaps the at least one PUCCH; or when the m PUSCHs comprise the n PUSCHs that satisfy the timing requirement, and a first number n of the n PUSCHs is smaller than a second number k of the at least one PUCCH, transmitting the at least one PUCCH, without transmitting the at least one of the m PUSCHs which overlaps the at least one PUCCH.

10. The method according to claim 1, further comprising: reporting a capability of the terminal device to the network device, wherein the capability of the terminal device comprises supporting the first transmission mode.

11. The method according to claim 1, wherein the first configuration parameter is further used to indicate whether the terminal device adopts a second transmission mode, and the second transmission mode comprises transmitting the at least one PUCCH without transmitting at least one of the m PUSCHs which overlaps the at least one PUCCH.

12. A method for transmitting uplink control information, applied in a network device, the method comprising:
   transmitting first Downlink Control Information (DCI) to a terminal device, wherein the first DCI is used to schedule m Physical Uplink Shared Channels (PUSCHs), where m is a positive integer;
   transmitting a first configuration parameter, wherein the first configuration parameter is used to indicate whether the terminal device adopts a first transmission mode, and the first transmission mode comprises multiplexing uplink control information into n PUSCHs among the m PUSCHs for transmission, where n is a positive integer smaller than or equal to m; and
   receiving, when at least one Physical Uplink Control Channel (PUCCH) partially overlaps a time domain range of the m PUSCHs, the m PUSCHs transmitted by the terminal device, wherein the uplink control information is multiplexed and transmitted in n PUSCHs among the m PUSCHs, where n is a positive integer smaller than or equal to m; or
   receiving, when the at least one PUCCH partially overlaps the time domain range of the m PUSCHs, the at least one PUCCH transmitted by the terminal device, without receiving at least one of the m PUSCHs which overlaps the at least one PUCCH.

13. The method according to claim 12, wherein
the n PUSCHs transmitted by the terminal device are received, and the uplink control information is multiplexed and transmitted in at least one first PUSCH among the n PUSCHs.

14. The method according to claim 13, wherein the a number of the PUCCH is one, wherein
   the first PUSCH is a penultimate PUSCH among the n PUSCHs; or
   the first PUSCH is an ending PUSCH among the n PUSCHs; or
   the first PUSCH is a beginning PUSCH among the n PUSCHs.

15. The method according to claim 13, wherein a number of the PUCCH is one; the n PUSCHs comprise a second PUSCH that carries a Channel State Information (CSI) feedback triggered by the first DCI; and
   the first PUSCH is determined based on the second PUSCH.

16. A network device, comprising:
   a processor;
   a transceiver connected to the processor; and
   a memory configured to store instructions executable by the processor,
   wherein the processor is configured to load and execute the executable instructions to perform the method for transmitting the uplink control information according to claim 12.

17. A terminal device, comprising:
   a processor;
   a transceiver connected to the processor; and
   a memory configured to store instructions executable by the processor,
   wherein the processor is configured to load and execute the executable instructions to:
   determine, based on first Downlink Control Information (DCI), m Physical Uplink Shared Channels (PUSCHs) to be transmitted, where m is a positive integer;
   receive a first configuration parameter transmitted by a network device, wherein the first configuration parameter is used to indicate whether the terminal device adopts a first transmission mode, and the first transmission mode comprises multiplexing uplink control information into n PUSCHs among the m PUSCHs for transmission, where n is a positive integer smaller than or equal to m; and
   multiplex the uplink control information carried in at least one Physical Uplink Control Channel (PUCCH) into the n PUSCHs for transmission, or transmit the at least one PUCCH, without transmitting at least one of the m PUSCHs which overlaps the at least one PUCCH, when the at least one PUCCH partially overlaps a time domain range of the m PUSCHs.

* * * * *